United States Patent [19]

Mahoney

[11] Patent Number: 5,270,563

[45] Date of Patent: Dec. 14, 1993

[54] METHOD AND MECHANISM FOR SENSING COPY SHEET WEIGHT

[75] Inventor: Gregory P. Mahoney, Fairport, N.Y.

[73] Assignee: Eastman Kodak Company, Rochester, N.Y.

[21] Appl. No.: 919,794

[22] Filed: Jul. 27, 1992

[51] Int. Cl.$^5$ .................. G01G 19/00; G01G 3/14; G03G 21/00

[52] U.S. Cl. .................. 177/145; 177/210 R; 355/311; 355/312

[58] Field of Search .................. 177/145, 210 R; 355/311, 312

[56] References Cited

U.S. PATENT DOCUMENTS

| | | |
|---|---|---|
| 4,106,765 | 8/1978 | Britt et al. |
| 4,223,884 | 9/1980 | Burnham et al. |
| 4,566,547 | 1/1986 | Furukawa .................. 177/177 X |
| 4,730,823 | 3/1988 | Barela et al. |
| 5,041,879 | 8/1991 | Akao et al. .................. 355/312 |
| 5,075,786 | 12/1991 | Ikenoue et al. .................. 355/311 X |

Primary Examiner—George H. Miller, Jr.
Attorney, Agent, or Firm—Tallam I. Nguti

[57] ABSTRACT

A reproduction apparatus having a logic and control unit (LCU) and selectable copy sheet supply units includes a mechanism for determining the sheet weight of copy sheets to be handled therein. The mechanism includes a platform for supporting one such sheet on a desired surface, and a proximity sensor that is connected to the LCU and mounted at a predetermined height above the sheet supporting surface. The mechanism also includes a variable voltage sheet buckling device for creating a buckle in the supported sheet sufficient to actuate the proximity sensor. Means are provided in the logic and control unit for reading the voltage level of the sheet buckling device at the actuation of the sensor, and for correspondingly reading from a truth table a predetermined sheet weight for the read voltage level.

11 Claims, 6 Drawing Sheets

METHOD AND MECHANISM FOR SENSING COPY SHEET WEIGHT

BACKGROUND OF THE INVENTION

1. Field of the Invention

This invention relates generally to electrostatographic reproduction apparatus which reproduce or copy original document images onto various types of copy sheets. More particularly, this invention relates to such a reproduction apparatus that includes a mechanism for sensing and determining the weight of each type of such copy sheets.

2. Background Art

Electrostatographic reproduction apparatus such as copiers and printers are well known for reproducing or copying original document images onto copy sheets. Typically, each such reproduction apparatus includes one or more sheet supply units from which one type of various types, sizes and weights of sheets is selectable for use in a copying job. After such a selection, sheets are fed seriatim from the selected supply unit by a device, for example a vacuum sheet feeding device, to receive a toner image from an image forming sub-system of the copier or printer. Following such image reception by each copy sheet, the sheet is transported to a fusing station where the toner image is fixed by means of heat and pressure onto the sheet. Thereafter, the sheet is transported to an output section of the copier or printer where such sheets are stacked and, for example, stapled.

The efficiency and overall reliability of such a reproduction apparatus depends in significant part on the performance of its sheet holding, sheet feeding, and sheet transporting devices. In addition, the quality of the copies produced on the copy sheets selected depends significantly on the effectiveness of the heat and pressure fusing station in fixing the toner image onto each such sheet.

Unfortunately, however, the performance of the sheet holding, sheet feeding, and sheet transport devices, as well as that of the fusing station, can be detrimentally affected by changes in the weight of the type of copy sheets selected and subsequently being held, fed, transported, and fused therein. Because there is often a wide range of different types of sheets, for example, the different types and different sizes of copy paper as are well known, such detrimental changes in copy sheet weight tend to occur more frequently than is recognized. For example, sheet multi-feed and sheet misfeed problems at sheet supply units occur in great part because the sheet feeding devices thereof were initially set up optimally for one weight or one type of sheet, but a new and different weight or type of sheet was subsequently added to the supply units without any optimal resetting of their sheet feeding device.

SUMMARY OF THE INVENTION

It is an object of the present invention to provide in an electrostatographic reproduction apparatus a mechanism for determining the weight of each receiver or copy sheet being held, fed, transported, and fused in such apparatus.

It is also an object of the present invention to provide such a reproduction apparatus which includes means for optimally and automatically resetting sheet holding, feeding, transporting and fusing devices responsively to changes in sheet weight.

In accordance with the present invention, a mechanism is provided for determining the weight of a copy sheet to be handled in a reproduction apparatus having a logic and control unit. The sheet weight determining mechanism comprises means defining a sheet feed-out plane and means for supporting a sheet flatly at the sheet feed-out plane. The mechanism also comprises an actuatable proximity sensing means mounted at a predetermined standard distance or height above the sheet feed-out plane and connected to the logic and control unit. The mechanism further comprises programmed means connected to the logic and control unit, and means for inducing a buckle in a sheet supported at the sheet feed-out plane such that the induced buckle progressively achieves a height that eventually equals the standard height and so is high enough above the feed-out plane to actuate the proximity sensing means. The buckle inducing means includes a variable voltage output unit whose voltage varies proportionately to the achieved height at the induced buckle, and that is linked to the programmed means. The programmed means include means for reading an output voltage level thereof at the actuation of the proximity sensing means, and for converting such a voltage level to a pre-programmed corresponding weight for sheets achieving the standard buckle height at such a voltage level.

BRIEF DESCRIPTION OF THE DRAWINGS

In the detailed description of the invention presented below, reference is made to the drawings, in which.

DETAILED DESCRIPTION OF THE INVENTION

Because electrostatographic reproduction apparatus and sheet supply units for use therein are well know, the present description will be directed in particular to elements thereof which form part of or cooperate more directly with the present invention. Elements thereof not specifically shown or described herein are assumed selectable from typical elements known in the prior art.

Figure 1:
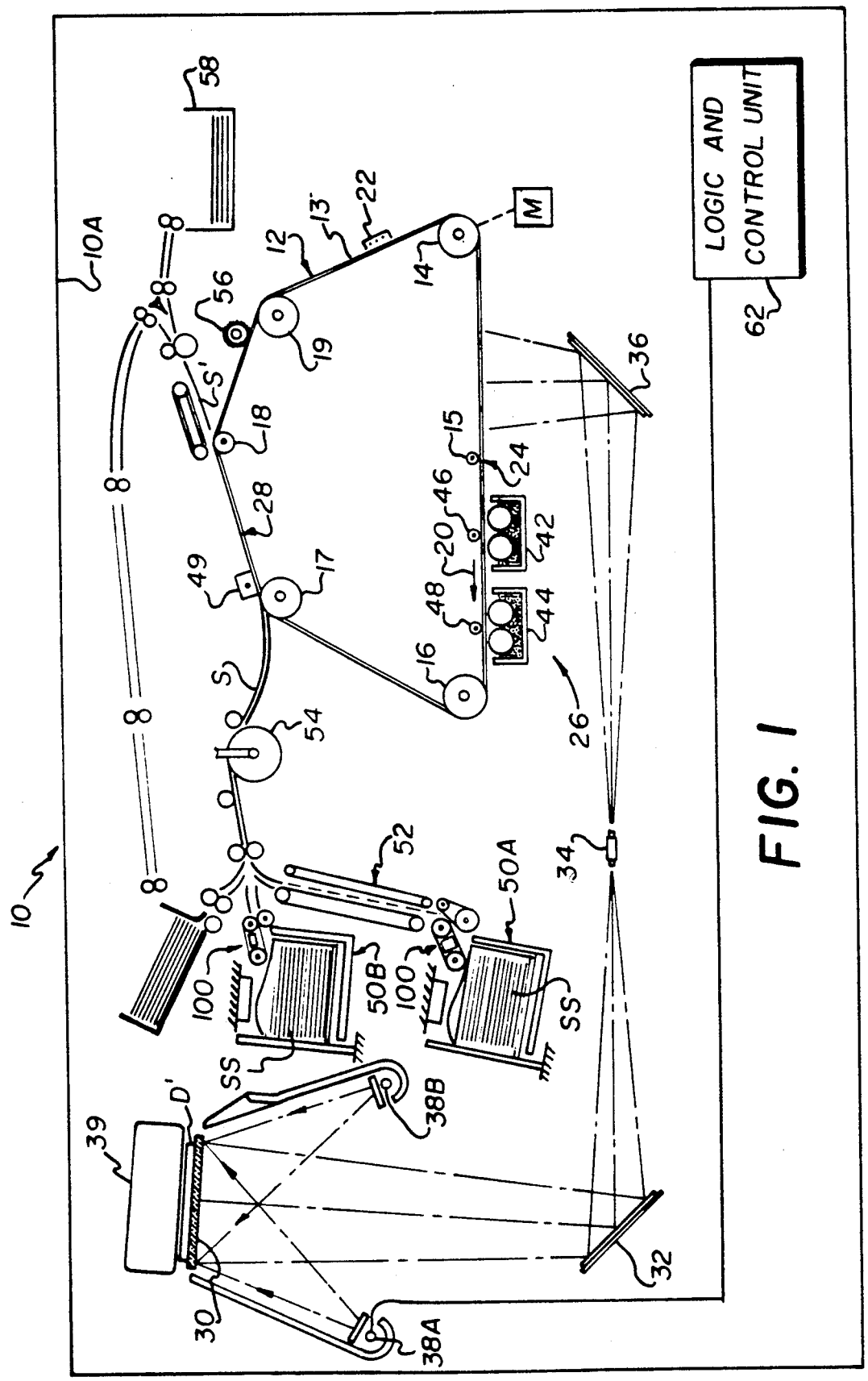
FIG. 1 is a schematic illustration of an exemplary electrostatographic reproduction machine or apparatus having copy sheet supply units including the document size determining mechanism of the present invention.

Referring now to FIG. 1, an exemplary electrostatographic reproduction machine or apparatus such as a copier is designated generally by the numeral 10 and is suitable for producing copies of an original image on suitable image-receiving or copy sheets. As shown, the reproduction apparatus or machine 10 includes a main housing 10A and an image-bearing member 12 having a front surface 13 with imaging and non-imaging areas. The member 12 can be a rotatable rigid drum or, for example, it can be a photoconductive web which as shown is trained about a series of transport rollers 14, 15, 16, 17, 18 and 19. The roller 14 is a drive roller and is coupled to a motor M for driving the member 12 in the direction, for example, of the arrow 20. Such movement of the member 12 causes successive imaging areas of the front surface 13 thereof to sequentially pass a series of electrophotographic process stations. As shown, such process stations include a charging station 22 at which each imaging area of the surface 13 receives a uniform layer of electrostatic charges. After the charging station 22, the other stations include an exposure station 24, a development station 26 and an image-transfer station 28.

At the exposure station 24, light reflected from an original document D' positioned on a transparent platen 30 is projected through an object mirror 32, a lens-shutter system 34 and an image mirror 36 onto a selected imaging area of the charged surface 13 of the photoconductor 12. Such a light projection imagewise dissipates portions of the charged imaging area to form thereon a latent electrostatic image of the original image of the document D'. The reflected light may be achieved, for example, by means of flash lamps 38A, 38B as is well known in the art. As is also well known in the art, the document D' can be positioned on the transparent platen 30 manually, or automatically by means of a recirculating document feeder 39.

The latent electrostatic image formed at the exposure station 24 is thereafter developed, that is, made visible with marking or toner particles at the development station 26. As shown, the development station 26 may include at least a development apparatus such as a magnetic brush apparatus 42, or 44 that is positioned adjacent the surface 13 (and across from a back-up roller 46, or 48) for applying charged toner particles which adhere to the electrostatic latent image to form a developed or toner image on such surface 13.

At the transfer station 28, the developed or toner image is transferred from the surface 13 onto a selected copy sheet S for example by electrostatic means that employs a corona charger 49. The selected copy sheet S is fed seriatim from one of the copy sheet supply units 50A, 50B of the present invention (to be described below) by transport means shown as 52. The sheet S is fed, as such, in timed registration with the moving toner image on the surface 13 by a registration gate 54 for receiving such toner image, properly registered at the transfer station 28. After such toner image transfer, the transferring area of the surface 13 then moves past a cleaning element 56 which removes any residual particles from such area, thus cleaning and preparing the area for reuse. Meanwhile, the copy sheet S (now carrying the transferred toner image thereon) is moved through a fusing station 58 where the toner image is fixed to the sheet, and then into an output device such as a tray 59.

For monitoring and controlling the operation of the various stations and elements of the reproduction apparatus 10, the apparatus 10 includes a logic and control unit (LCU) 62. As is well known, the LCU 62 comprises stored programs which control machine functions, and which are utilized to sequentially actuate and deactuate operative elements of each of the process stations in response to monitored input signals. The LCU 62, for example, also comprises input/output circuit boards, a bus structure consisting of a series of addresses, data and control signal lines, and a central processing unit (CPU). The CPU, for example, includes a test point, communication chips and two microprocessors, such as an INTEL8032 and an INTEL80286 which are used for memory storage, for communication with other dedicated microprocessors within the apparatus 10, and for controlling all other functions of the apparatus 10 that are not controlled by a dedicated microprocessor. The second microprocessor of the CPU, for example, the INTEL80286 includes ROM, RAM and one-time programmable features, and is used for temporary storage of information generated by the CPU for machine control.

Figure 2:
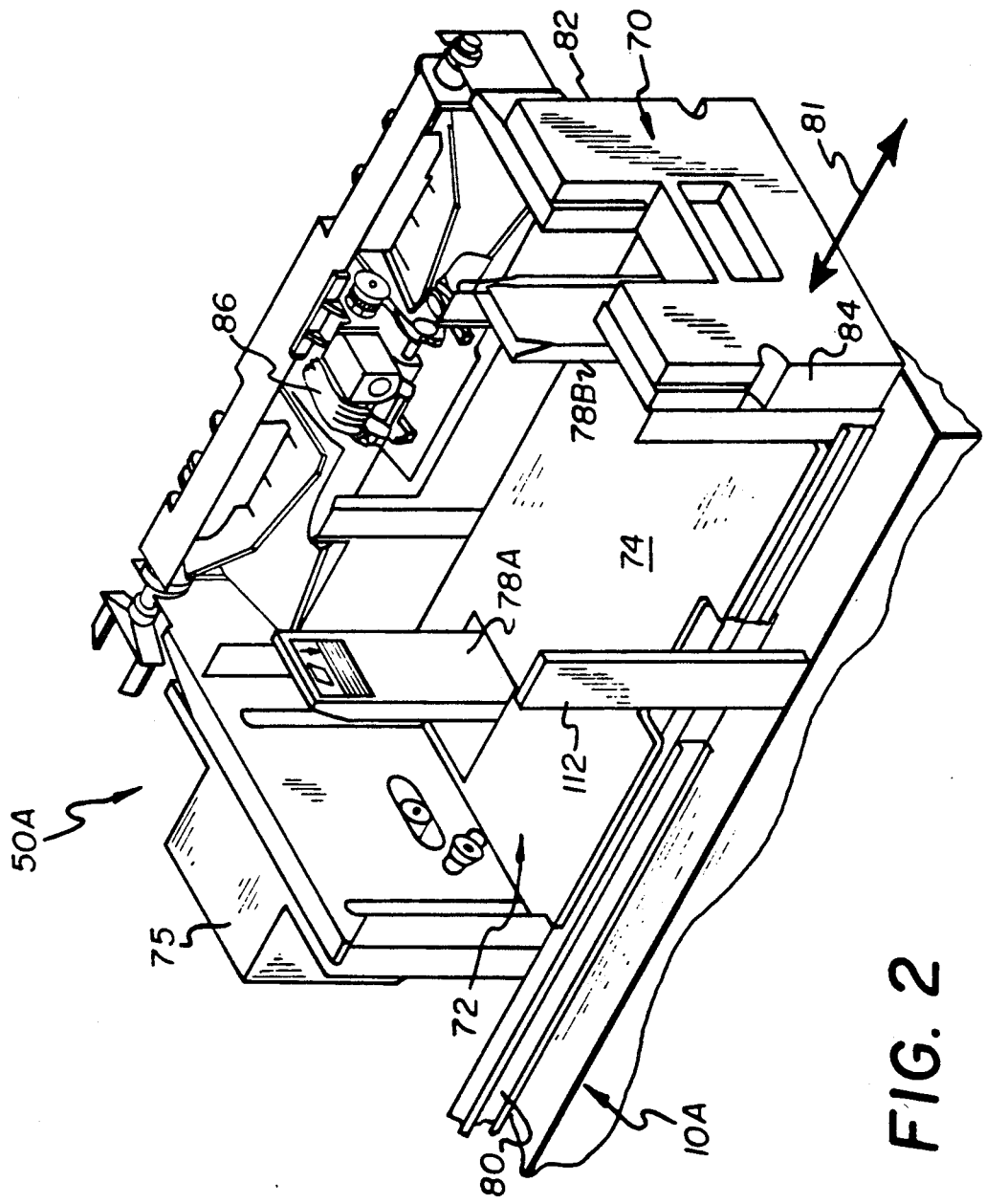
FIG. 2 is a view in perspective and on an enlarged scale of one of the sheet supply units of the present invention.
Figure 3:
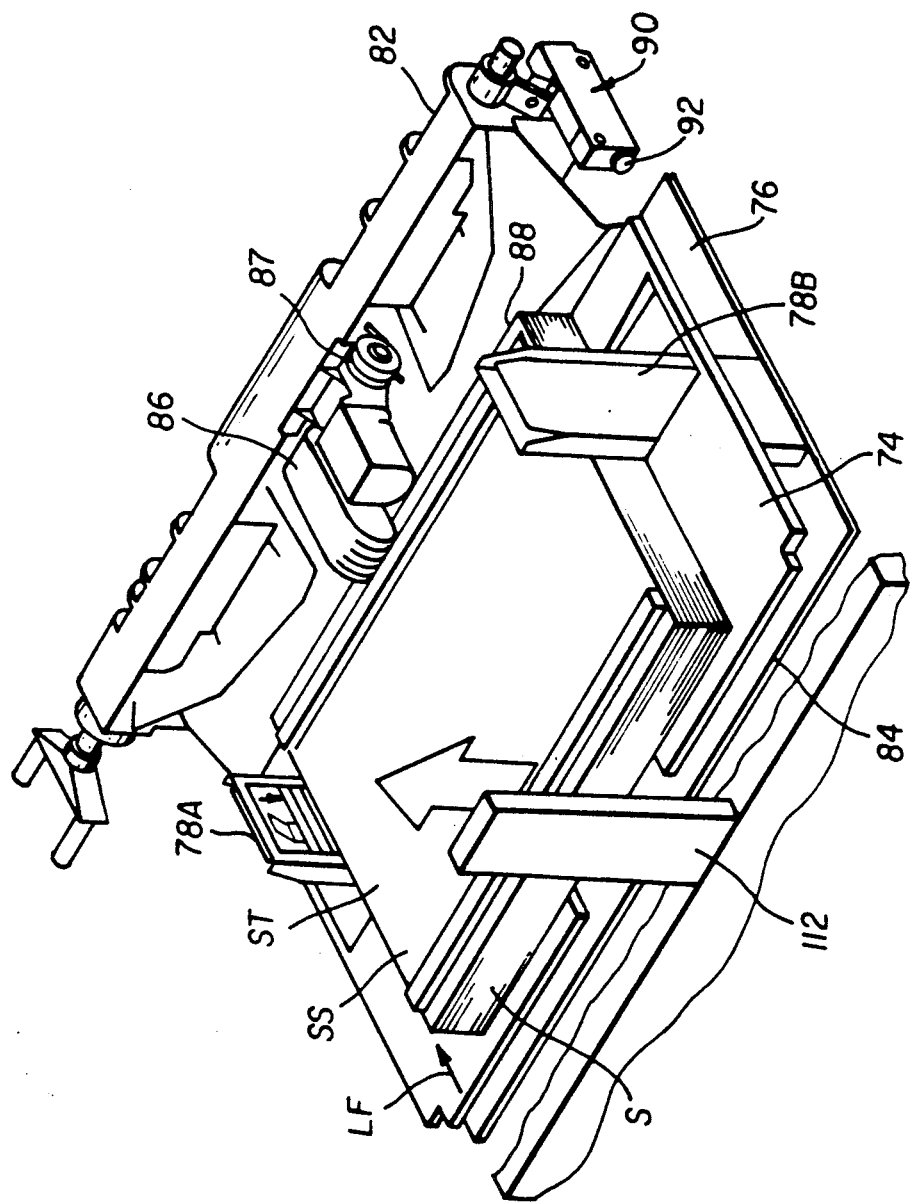
FIG. 3 is a view similar to that of FIG. 2 and showing the sheet supply unit with a stack of copy sheets being moved to a top sheet feed-out position of the present invention.
Figure 4:
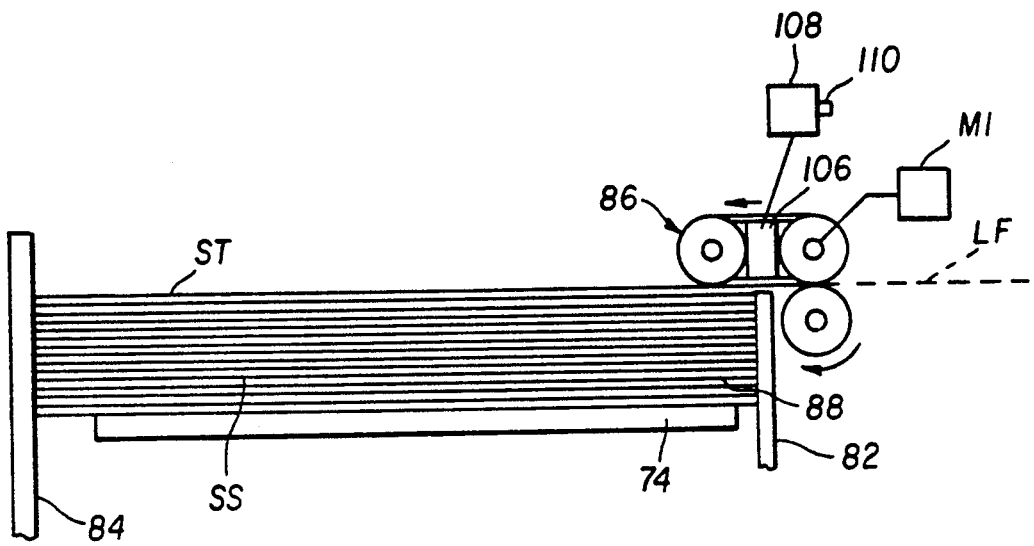
FIG. 4 is a side view, partly in section, of the sheet supply unit of FIG. 3.

Referring now to FIGS. 2 to 4, one of the copy sheet supply units 50A, 50B of the present invention, for example the unit 50A is shown in detail. With respect to the present invention, copy sheet supply units 50A and 50B, which may hold different size and different type sheets, are identical structurally and operationally, hence only one of them will be described here. Although the reproduction apparatus 10 is shown as having two such copy sheet supply units for holding different types and different size sheets, it should be understood that any desired number of such sheet supply units may be included in the apparatus 10. As shown, the copy sheet supply unit 50A includes a frame 70 that partially defines a drawer compartment 72 for holding a stack SS of sheets S. The stack SS is supported on a sheet holding surface or platform 74 that is movable up and down (by an elevator drive system 75) relative to a base 76 of the frame 70. The platform 74 includes appropriate slots for receiving vertically extending copy sheet edge guides shown as 78A, 78B. The guides 78A, 78B may be adjustably movable towards and away from each other for aligning each of the different size copy sheets on the platform 74.

As shown in FIG. 2, the frame 70 of the supply unit 50A is slidably supported on a set of guides (not shown) and rails 80 for slidable movement into and out of the main housing 10A of the reproduction apparatus 10 as indicated by the arrow 81. The frame 70 and hence the drawer compartment 72 has a front or forward side shown as 82, and a rear or backward side shown as 84. Front and rear orientations are relative to the direction in which copy sheets are fed or supplied (frontwards) from the drawer compartment 72. For feeding a copy sheet S seriatim from the stack SS, the copy sheet supply unit 50A includes a feedhead 86 that is mounted pivotably so as to be alignable at a sheet feed-out level shown as LF (FIGS. 3-5) at the top of the compartment 72. The feedhead 86 is mounted as such, at a substantially central position between end edges of the stack SS as such end edges are defined by the edge guides 78A, 78B, and to the front edge 88 of the stack SS. As mounted, the feedhead 86 can be urged, for example, by means including a spring 87, into contact with the top of the stack SS when the top of the stack is at the sheet feed-out level LF.

With the platform in a down position as determined for example by a down-position limit switch (not shown) associated with the elevator drive system 75, the frame 70 can be pulled out into an inoperative position so that a new supply of sheets can be placed on the platform 74 or on a partial stack of sheets already on such platform 74. Upon pushing the frame 70 back into its operative position within the housing 10A of reproduction apparatus 10, the elevator system 75 may automatically raise the platform 74 until the top of the stack SS is at the feed-out level LF, properly aligned as well as in contact with the pivotably mounted feedhead 86. A sheet level sensor assembly shown as 90 (FIG. 3) cooperates with an associated optical beam (not shown) to align the top of the stack SS at the sheet feed-out level LF, as well as in such contact with the feedhead 86. The degree or amount of contact pressure between the feedhead 86 and the top sheet ST, of the stack SS can be adjusted for example by means including a screw 92 (FIG. 3) that is connected to a spring within the level sensor 90.

Figure 5:
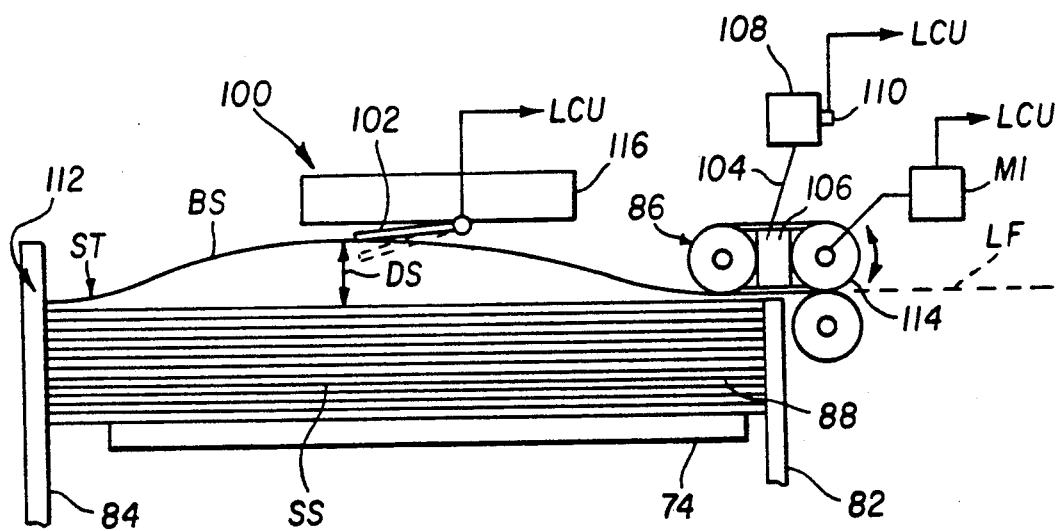
FIG. 5 is a side view, partly in section, of the sheet supply unit of FIG. 4 including a reversible sheet vacuum feeder and the microswitch of the present invention.
Figure 6:
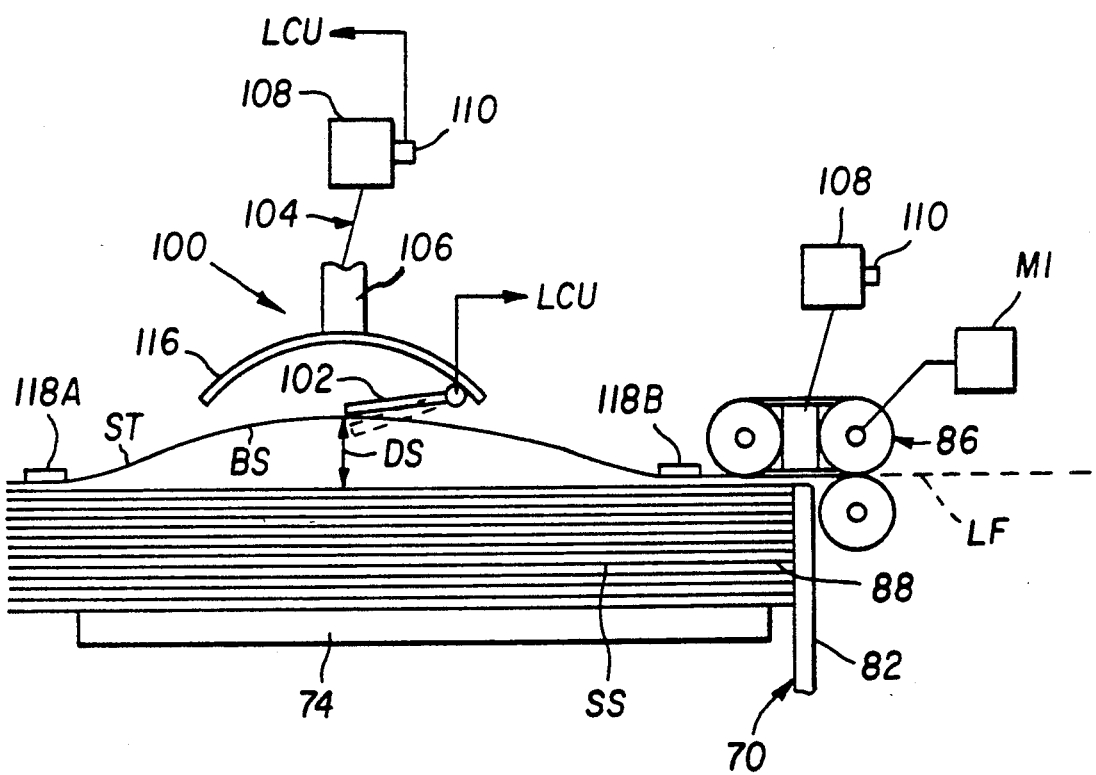
FIG. 6 is a view similar to that of FIG. 5 showing as an alternate embodiment, a centrally located vacuum sheet buckling device and the sheet hold down members of the present invention.
Figure 7:
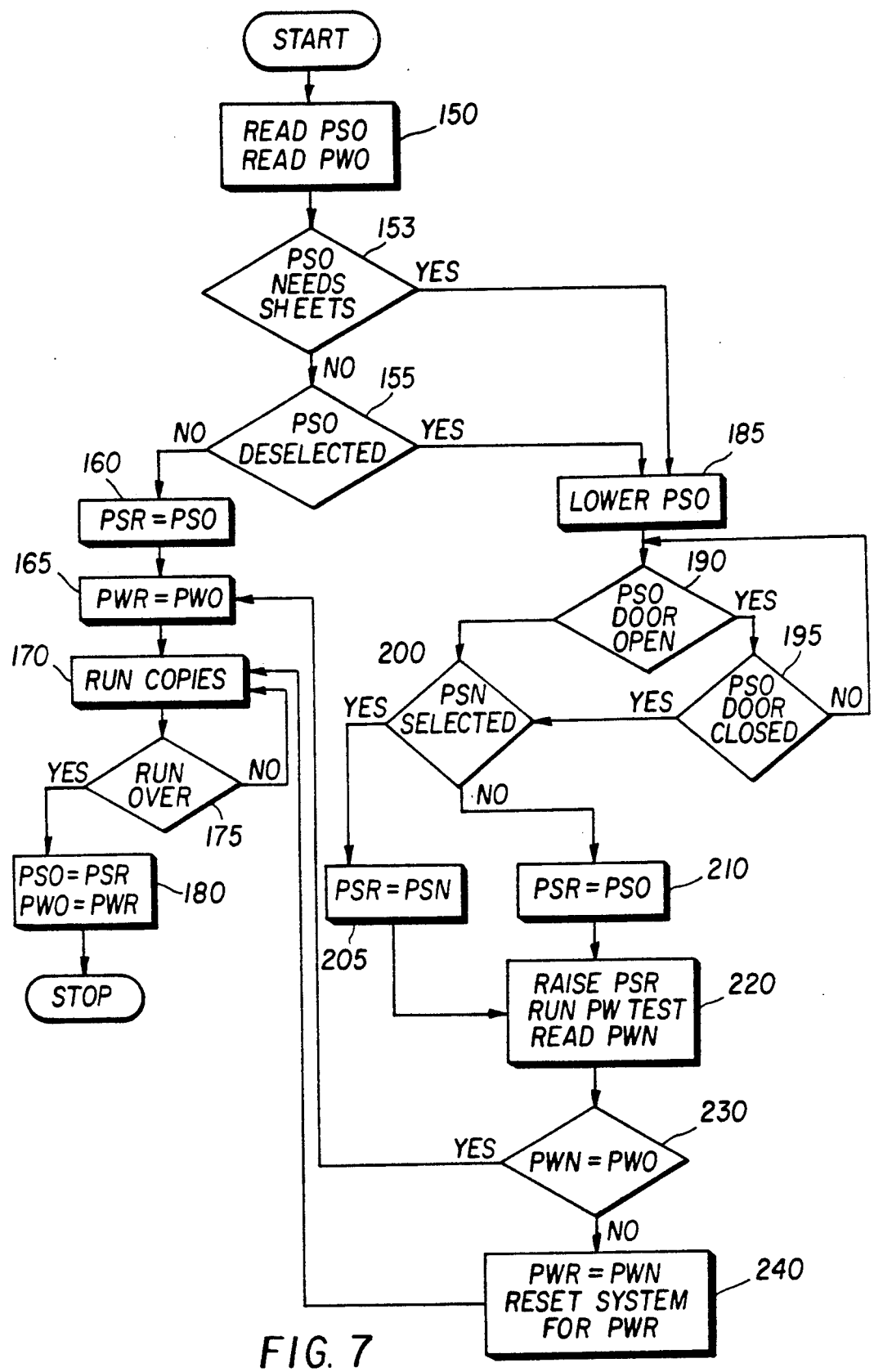
FIG. 7 is a flow chart of the method for determining the weight of copy sheets in the reproduction apparatus of the present invention.

Referring now to FIGS. 5 to 7, each copy sheet supply unit 50A, 50B of the reproduction apparatus 10 includes a mechanism of the present invention designeted generally by the numeral 100, 101' (FIGS. 5 and 6) for determining the weight of each copy sheet S that is being fed, held, transported and fused as described above within the reproduction apparatus 10. In a first embodiment, the copy sheet weight mechanism 100 comprises means, including the feedhead 86 for defining a sheet feed-out plane LF, and means such as the platform 74 for supporting a copy sheet, for example, the top sheet ST of a stack SS of such sheets at the feed-out plane LF. The top sheet ST, as such, is supported flatly on a sheet holding surface such as the surface of the platform 74 itself, or the top of a stack SS of sheets that are supported by the platform 74. In either case, the top sheet ST must be supported as such, so that it is at the sheet feed-out level or plane LF of the particular sheet supply unit.

The sheet weight determining mechanism 100, 100' (FIGS. 5 and 6) also comprises an actuatable proximity switch such as a microswitch 102 (FIGS. 5 and 6) that is mounted for actuation at a predetermined standard height or distance, shown as DS, of approximately one-half (0.5) of an inch above the sheet feed-out plane or level LF. As such, the actuation point of the microswitch 102 is also about 0.5 of an inch above the sheet supporting surface (the surface of platform 74 on the top of stack SS) when such surface is at the sheet feed-out plane LF. As shown, the microswitch is connected for monitoring and control purposes to the LCU 62 of the reproduction apparatus 10.

The sheet weight determining mechanism 100, 100' further comprises a variable voltage output device 104, 104' such as a vacuum device that is also connected to the LCU 62 and is useful for progressively inducing or creating a buckle BS in the top sheet ST of the stack SS when such top sheet ST is being supported flatly at the sheet feed-out plane LF. The buckle BS so induced or created progressively achieves a height that eventually equals the standard height or distance DS and so is then significantly high enough above the sheet supporting surface (at the feed-out plane LF) to actuate the microswitch 102. As shown, the variable voltage vacuum device 104, 104' comprises a plenum 106, 106' and a vacuum blower motor 108, 108'. The motor 108, 108' has a potentiometer device 110, 110' connected thereto whose output voltage changes for example with the changing rotation of the motor 108, 108' and with the achieved height of the buckle being created. The mechanism 100, 100' also comprises a programmed means 62A associated with the LCU 62 for reading and converting into a pre-programmed corresponding copy sheet weight, the voltage level of the variable voltage vacuum device 104 at the time the height of the buckle BS reaches the standard distance DS and actuates the microswitch 102.

For creating the buckle BS in a top sheet ST of a stack SS of copy sheets on the platform 74, the mechanism 100 in the first embodiment (FIG. 5) includes a sheet hold-back member shown as 112, that is positioned at the rear or back edge 84 of the stack of sheets SS, for stopping backward movement of sheets in the stack SS. In addition, the feedhead 86 of this first embodiment is designed to incorporate the variable voltage vacuum device 104 such that an apertured feed belt 114 which is trained around the plenum 106 is rotatable thereabout for example by a drive means M1. As shown, the belt 114 can be rotated in the counterclockwise direction to move the top sheet ST forwardly towards the front side 82. The belt 114 can also be rotated in the clockwise direction to move such top sheet ST against the hold-back member 112. With proper adjustment of the pressure of the feedhead 86 as described above on such top sheet ST, clockwise rotation of the belt 114 should quickly and progressively induce or create the buckle BS in the top sheet ST as such sheet ST is being moved against the hold-back member 112. The proximity or microswitch 102 should be mounted on a support member such as a member 116 that is located so as to locate the actuation point of such switch where the curved buckle BS has its highest height point of deflection from the feed-out plane LF.

In a second embodiment (FIG. 6), the mechanism 100' includes a pair of spaced apart sheet hold-down members 118A, 118B which are positioned to lightly contact the top sheet ST when such sheet is being supported at the feed-out plane or level LF. The contact should be such that the top sheet ST can be freely moved horizontally from under the members 118A, 118B. As shown, the members 118A, 118B are positioned towards the front and rear edge portions of the top of the stack SS. The variable voltage vacuum device 104' of the second embodiment is a separate unit from the feedhead 86, and as shown is mounted centrally with respect to the positioning of the hold-down members 118A, 118B. As mounted, the device 104' is useful for applying an upwardly and centrally pulling vacuum force on the initially flat top sheet ST. Applying the vacuum, as such, pulls the center of the top sheet ST upwards and causes its edge portions to slide horizontally under the members 118A, 118B towards its buckling center.

Such pulling in cooperation with a vertical restriction of the front and rear edge portions of the top sheet ST (by the members 118A, 118B at the feed-out plane on level LF) thereby causes the sheet ST to buckle in the center as shown. Again, the proximity or microswitch 102 should be mounted and positioned at the height DS so as to be at the peaking or maximum displacement point of the buckle BS relative to the plane LF. As shown, the support member 116 for the microswitch 102 can be a hood portion for the vacuum plenum 106.

The method of the present invention for determining the weight of copy sheets in the apparatus 10 is illustrated in FIG. 7. In accordance with the method of the present invention, when an operator pushes the start button of the reproduction apparatus 10, the logic and control unit (LCU) 62, based on stored information (Box 150), reads which of the plurality of copy sheet supply units (PSO), for example 50A or 50B, was used during the last copy run of the apparatus. The LCU 62 also reads what the sheet weight (PWO) was of the sheets last used from that particular copy sheet supply unit (PSO). The LCU 62 then recognizes whether PSO has needed new sheets (Box 153) since the last copy run, and whether the operator has deselected (Box 155) that particular supply unit (PSO) for example by selecting a new sheet supply unit (PSN).

If the PSO has needed no new sheets since the last copy run, and the operator does not deselect PSO, then the LCU 62 recognizes that the supply unit for the current copy run being started (PSR) will be the same as PSO (Box 160). As such, the sheets and hence sheet weight (PWR) for sheets to be used in the current copy run being started is assumed to be the same (PWO) as that from the last run (Box 165). Accordingly, the settings for adjustable sheet handling sub-components of the apparatus 10, for example the previous optimal settings for the vacuum level of the sheet feedhead 86 of the selected copy sheet supply unit (PSR), and the nip pressure of the fusing station 58, will be left unchanged. The number of copies required by the operator are then run (Boxes 170, 175). At the end of such a run, PSR is now recorded as PSO, and PWR is recorded as PSO (Box 180) for purposes of the next run. After recording them as such, the LCU 62 then stops the apparatus 10, until the start button is pushed again for the next run.

On the other hand, if PSO has needed sheets or has been deselected by an operator, the LCU will cause PSO to be lowered (Box 185) to a position for receiving new sheets as is well known in the art. In the lowered position, the door to PSO may be opened (Box 190) for new sheets to be added, and then reclosed (Box 195). Alternatively, with PSO in the lowered position, the operator may select a new copy sheet supply unit (PSN) (Box 200). It should be noted that at this point a number of options are available to the operator including the operator reselecting PSO, following the addition of new sheets therein, as the PSR for the run being started. Accordingly, the PSR can be a newly selected supply unit PSN (Box 205) or it can be PSO probably with new sheets added thereto (Box 210).

In either case, the sheet weight determining method of the present invention requires the top sheet ST of the selected supply unit PSR to be raised (if necessary) to the sheet feed-out plane or level LF (Box 220), so that a copy sheet weight determining test (PWTEST) can be run by the mechanism 100, 100' on such top sheet ST. According to the first embodiment (FIG. 5) of the mechanism 100, running the PWTEST involves first running the feed belt 114 in the clockwise or reverse direction while it is in contact with the front edge portion of the top sheet ST. At the same time, it involves starting the vacuum blower motor 108 thereof at a minimum voltage output level and then progressively increasing its RPM and hence the voltage output level of its potentiometer 110 (and the vacuum on the top and contacting sheet ST) as the height of the buckle being formed increases, until a sheet buckle height is reached at which the buckle contacts and actuates the microswitch 102. At the actuation of the microswitch 102, the programmed means of the LCU 62 reads and records the voltage level VLB of the motor 108. The particular voltage level value VLB is then used by the programmed means to select, from an empirically developed and LCU pre-programmed truth table, a new predetermined copy sheet weight (PWN) that in the mechanism 100, 100' would substantially correspond to a voltage level value of VLB as read. Such a pre-programmed truth table may in part look as follows:

| VLB | COPY SHEET WEIGHT |
|---|---|
| 10 volts | $\frac{49 \text{ grams}}{(\text{meter})^2}$ |
| 13 volts | $\frac{93 \text{ grams}}{(\text{meter})^2}$ |
| 17 volts | $\frac{151 \text{ grams}}{(\text{meter})^2}$ |
| 20 volts | $\frac{194 \text{ grams}}{(\text{meter})^2}$ |
| 24 volts | $\frac{252 \text{ grams}}{(\text{meter})^2}$ |

The new copy sheet weight PWN from the PWTEST is then read by LCU from the truth table. PWN at this point could indicate that the same weight of sheets as was originally in PSO is in PWN or was added to PSO. In that case, PWN will equal PWO (Box 230) and so PWR will be set equal to PWO (Box 165) and therefore requiring no resetting of adjustable sheet handling devices of the reproduction apparatus 10. However, if a different weight sheet is in the new selected supply unit (PSN), or was added to PSO (Boxes 190, 195) then PWN will be different from PWO. PWR will thus be equal to the new and different PWN (Box 240). Accordingly, the LCU 62 causes settable or adjustable sheet handling devices of the reproduction apparatus 10 to be optimally reset so as to operate effectively and reliably for sheets with the new and different weight PWN. For example, the vacuum level of the feedhead 86 for feeding sheets out of the sheet supply unit 50A, 50B can accordingly be optimized by adjusting up or down to previously and empirically determined values for feeding sheets each having a weight PWN. Similarly, other devices or components of the reproduction apparatus 10 can also be reset optimally for a new weight of sheets before the current or started run can proceed.

To proceed with the current run, the feedhead 86 is stopped when the microswitch 102 is actuated for the PWTEST as above, and then is restarted to run in the opposite or counter clockwise direction so as to feed the top sheet ST (and then others) forwardly out of the supply unit 50A, 50B. Running the feedhead in the sheet feed-out direction, as such, first eliminates the buckle BS in the top sheet, and then pulls the sheet out of the supply unit into the sheet transport system, such as 52 (FIG. 1).

The method of the present invention is practically the same in many aspects with respect to the second embodiment (FIG. 6) of the mechanism 100, 100'. The only difference is in the manner of creating the buckle, which as described above is done independently of the feedhead 86. However, when the PWTEST and any optimal resetting of devices and components is done in the case of the second embodiment, the feedhead 86 (which does not need in this case to be reversible) is started and run in the sheet feed-out (frontwards) direction. Initially, such frontwards movement of the top, buckled sheet eliminates the buckle BS and then feeds the sheet horizontally under the members 118a, 118B out from the supply unit 50A, 50B.

As can be seen, an electrostatographic reproduction apparatus 10 has been provided that includes a logic and control unit and has adjustable operating components such as a copy sheet feedhead 86, and a nip forming roller-type heat and pressure fusing station. The reproduction apparatus 10 is provided with a mechanism 100, 100' for determining the sheet weight of copy sheets being handled therein. The mechanism 100, 100' includes a variable voltage output device 104, 104' for progressively creating a buckle in one of a new set of copy sheets to be used in a copy run of the apparatus 10, and proximity sensing and switch means that are connected to the logic and control unit thereof for sensing a predetermined standard height of such buckle. The mechanism 100, 100' also includes programmed means including a look-up truth table of variable voltage levels of the variable voltage output device 104, 104' that correspond to predetermined copy sheet weights which were found to buckle at such voltage levels, to the predetermined height or size DS of buckle. Accordingly, the weight of a sheet buckling to a height DS at a particular voltage level can be determined.

The invention has been described in detail with particular reference to preferred embodiments thereof, but it will be understood that variations and modifications can be effected within the spirit and scope of the invention.

What is claimed is:

1. A reproduction apparatus for producing copies of original documents on copy sheets, the reproduction apparatus comprising:
   (a) image forming means;
   (b) means for handling copy sheets to which formed images are transferred;
   (c) a logic and control unit for monitoring and controlling functions of components of the reproduction apparatus; and
   (d) a mechanism for determining the weight of a copy sheet being handled by said copy sheet handling means, said mechanism including:
      (i) an actuatable proximity switch having an actuation point located a predetermined actuation distance above a sheet feed-out plane, said proximity switch being connected to said logic and control unit;
      (ii) means for progressively inducing a buckle in a sheet supported on said feed-plane such that said buckle eventually achieves a height equal to said actuation distance above said sheet feed-out plane so as to actuate said microswitch, said sheet buckle inducing means including a unit having a voltage output varying directly with said height of said buckle; and
      (iii) programmed means for reading and converting a voltage level output of said unit of said buckle inducing means into a corresponding pre-programmed copy sheet weight.

2. The reproduction apparatus of claim 1 wherein said programmed means of said logic and control unit includes means for reading and recording the voltage level of said variable voltage output unit of said buckle inducing means at the point when said microswitch is actuated.

3. The reproduction apparatus of claim 2 wherein said programmed means of said logic and control unit includes a lookup truth table of predetermined copy sheet weights corresponding to particular voltage levels of said variable voltage output unit of said sheet buckle inducing means.

4. The reproduction apparatus of claim 3 wherein said lookup truth table program includes a plural number of different voltage levels of said variable voltage output unit and a corresponding plural number of different predetermined copy sheet weights.

5. The reproduction apparatus of claim 4 including sheet feed-out plane defining means having a sheet feedhead located at a sheet feed-out level of a copy sheet supply unit.

6. The reproduction apparatus of claim 5 wherein said predetermined distance for mounting said microswitch is in the range of approximately 0.5 of inch above said sheet feed-out plane of the copy sheet supply unit.

7. The reproduction apparatus of claim 6 wherein said sheet buckle inducing means is a vacuum device for partially moving a supported sheet, and a sheet hold back member against which said sheet is movable.

8. The reproduction apparatus of claim 7 wherein said vacuum device is mounted centrally above said supported sheet and includes a pair of spaced apart hold-down members for holding down the edge portions of said supported sheet against a centrally applied vacuum pull on said sheet.

9. The reproduction apparatus of claim 7 wherein said vacuum device is mounted at said sheet feed-out plane and has reversible drive means for selectively moving said supported sheet either in a forward direction out of said supply unit or in the opposite, backward direction.

10. A reproduction apparatus, including a logic and control unit, for producing copies of original images on selected copy sheets, the reproduction apparatus comprising:
   (a) means for forming images;
   (b) copy sheet supply units from which sheets are supplied and to which new sheets can be added, each said sheet supply unit having an open position for adding sheets and a closed and operating position; and
   (c) a mechanism for determining the sheet weight of new copy sheets added to each copy sheet supply unit, said sheet weight determining mechanism including a sheet buckle inducing means having a variable voltage output unit for progressively creating a buckle in one said new copy sheets such that the height of said buckle varies directly with the voltage output level of said variable voltage unit, an actuatable proximity switch connected to the logic and control unit, for actuation by said created buckle, and programmed means for reading and converting a voltage level of said buckle creating device, at the actuation of said proximity switch, to a corresponding pre-programmed copy sheet weight.

11. In a reproduction apparatus having a logic and control unit and sheet handing components, a method for determining the sheet weight of sheets to be handled therein during an initiated copy run, the method comprising the steps of:
   (a) supporting a sheet to be handled flatly on at a sheet feed-out level;
   (b) progressively creating in said supported sheet a sheet-buckle eventually achieving a predetermined height using a sheet-buckling device having a variable voltage output unit whose voltage output varies directly with the height of said created buckle;

(c) actuating a proximity switch with said sheet buckle at said predetermined height;

(d) reading the output voltage level of said variable voltage output unit at the actuation of said proximity switch; and (e) reading from a pre-programmed truth table in the logic and control unit a predetermined copy sheet weight corresponding to said read output voltage level of said variable voltage unit.

* * * * *